(12) United States Patent
Wu et al.

(10) Patent No.: US 10,634,901 B2
(45) Date of Patent: Apr. 28, 2020

(54) COLOR WHEEL FOR PROJECTOR

(71) Applicant: QISDA CORPORATION, Taoyuan (TW)

(72) Inventors: Meng-Yu Wu, Yun-Lin County (TW); Tsung-Hsun Wu, Taoyuan (TW); Chih-Chieh Tsung, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/214,144

(22) Filed: Dec. 10, 2018

(65) Prior Publication Data

US 2019/0179133 A1 Jun. 13, 2019

(30) Foreign Application Priority Data

Dec. 13, 2017 (CN) .......................... 2017 1 1332804

(51) Int. Cl.
*G02B 26/00* (2006.01)
*G03B 21/20* (2006.01)

(52) U.S. Cl.
CPC .......... *G02B 26/008* (2013.01); *G03B 21/204* (2013.01)

(58) Field of Classification Search
CPC .... G03B 21/14; G03B 21/145; G03B 21/204; G03B 21/206; G03B 21/208; G03B 21/315; H04N 9/3102; H04N 9/3114; H04N 9/3117; H04N 9/3141; G02B 26/02; G02B 26/008; G02B 26/0833; G02B 26/0875

See application file for complete search history.

(56) References Cited

U.S. PATENT DOCUMENTS

| | | | |
|---|---|---|---|
| 2013/0003368 A1* | 1/2013 | Li | H04N 9/3114 362/231 |
| 2014/0176914 A1* | 6/2014 | Mueller | F21S 10/007 353/31 |
| 2018/0249137 A1* | 8/2018 | Kobayashi | G03B 21/14 |

FOREIGN PATENT DOCUMENTS

CN          1701615 A    11/2005

\* cited by examiner

*Primary Examiner* — Sultan Chowdhury

(57) ABSTRACT

A color wheel used in a projector includes X color blocks and Y filter blocks; therein, X is an integer equal to or larger than 3. The X color blocks are defined to be arranged in an annular direction by repeating (N-1) times; therein, N is an integer equal to or larger than 2. The light permeability characteristics of the X color blocks are distinct from one another. The X color blocks correspond to X light colors respectively. The X color blocks are substantially equal in area. The Y filter blocks are formed of the X color blocks. The Y filter blocks correspond to the X light colors. One of the Y filter blocks is formed by two color blocks of one of the X color blocks.

19 Claims, 7 Drawing Sheets

COLOR WHEEL FOR PROJECTOR

BACKGROUND OF THE INVENTION

1. Field of the Invention

The present invention relates to a color wheel, and more particularly to a color wheel for a projector.

2. Description of the Prior Art

For projection systems using a single digital light processing (DLP) chip, the light splitting therefor is based on time divisions and is usually performed by a color wheel. If the color wheel includes only three filter blocks corresponding to red, green, and blue respectively, red light, green light, and blue light are individually produced once in one turn of the color wheel, which probably makes projected images with defects (e.g. rainbow artifact). For this issue, a common solution is to increase the quantity of the filter blocks of the color wheel, e.g. from 3 to 6, i.e. the red filter block, the green filter block, and the blue filter block are arranged repeatedly. For this case, red light, green light, and blue light are individually produced twice in one turn of the color wheel, which can reduce the effect of rainbow artifact in the projected images. However, in this solution of repeating the filter blocks, because the filter blocks increase in quantity, the production difficulty and cost of the color wheel will increase. Furthermore, a light source will face two filter blocks in different colors at junctions or spoke transition areas of any two adjacent filter blocks, resulting in that the color of the light from the light source through the color wheel is impure. Thus, when the filter blocks increase in quantity, the spoke transition areas increase in quantity resulting in reduction of color light output or color brightness.

SUMMARY OF THE INVENTION

The present invention provides a color wheel for a projector. The arrangement order for color blocks of the color wheel is designed so as to decrease the quantity of the actual filter blocks and the quantity of spoke transition areas on the color wheel as well, which can improve the color brightness of the projector.

A color wheel for a projector of an embodiment according to the invention includes X color blocks and Y filter blocks. The X color blocks are defined to be arranged in an annular direction by repeating (N−1) times. Light permeability characteristics of the X color blocks are distinct from one another. The X color blocks correspond to X light colors respectively. The X color blocks are substantially equal in area. X is an integer greater than or equal to 3. N is an integer greater than or equal to 2. Furthermore, the Y filter blocks are formed of the X color blocks. The Y filter blocks correspond to the X light colors. Therein, one of the Y filter blocks is formed by adjacent two of the color blocks having the same light permeability characteristic. In another aspect, in the color wheel, the Y physical filter blocks are arranged in a ring. The color blocks are defined on the Y filter blocks. Therein, the color blocks are grouped into N sets of color blocks. Each set includes X color blocks. In practice, one set of color blocks (i.e. the X color blocks) corresponds to a projection period (i.e. for projecting a frame of color image). Because one of the filter block is formed by two color blocks that have the same light permeability characteristic, this filter block corresponds to two adjacent projection periods; that is, no physical junction of two filter blocks exists at the junction of the two adjacent projection periods. In other words, this filter block eliminates a spoke transition area, which can improve the color brightness of the projector in comparison with the prior art.

A color wheel for a projector of another embodiment according to the invention includes Y filter blocks and N central angles. The Y filter blocks are arranged in an annular direction. The Y filter blocks correspond to X light colors. The Y filter blocks are defined to be formed of X color blocks. The light permeability characteristics of the X color blocks are distinct from one another. The X color blocks correspond to the X light colors respectively. The X color blocks are substantially equal in area. X is an integer greater than or equal to 3. The N central angles are equal. Each central angle corresponds to the X color blocks. N is an integer greater than or equal to 2. Therein, a first adjacent edge of any adjacent two of the central angles and a second adjacent edge of any adjacent two of the Y filter blocks are staggered. In another aspect, in the color wheel, the color blocks are defined on the physical Y filter blocks. Therein, the color blocks are grouped into N sets of color blocks. Each set includes X color blocks. In practice, one central angle (or one set of color blocks, i.e. the X color blocks) corresponds to a projection period (i.e. for projecting a frame of color image). Because the first adjacent edge of any adjacent two of the central angles and the second adjacent edge of any adjacent two of the Y filter blocks are staggered, no physical junction of two filter blocks exists at the junction of any adjacent two of the projection periods. In other words, the color wheel eliminates N spoke transition areas, which can improve the color brightness of the projector in comparison with the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
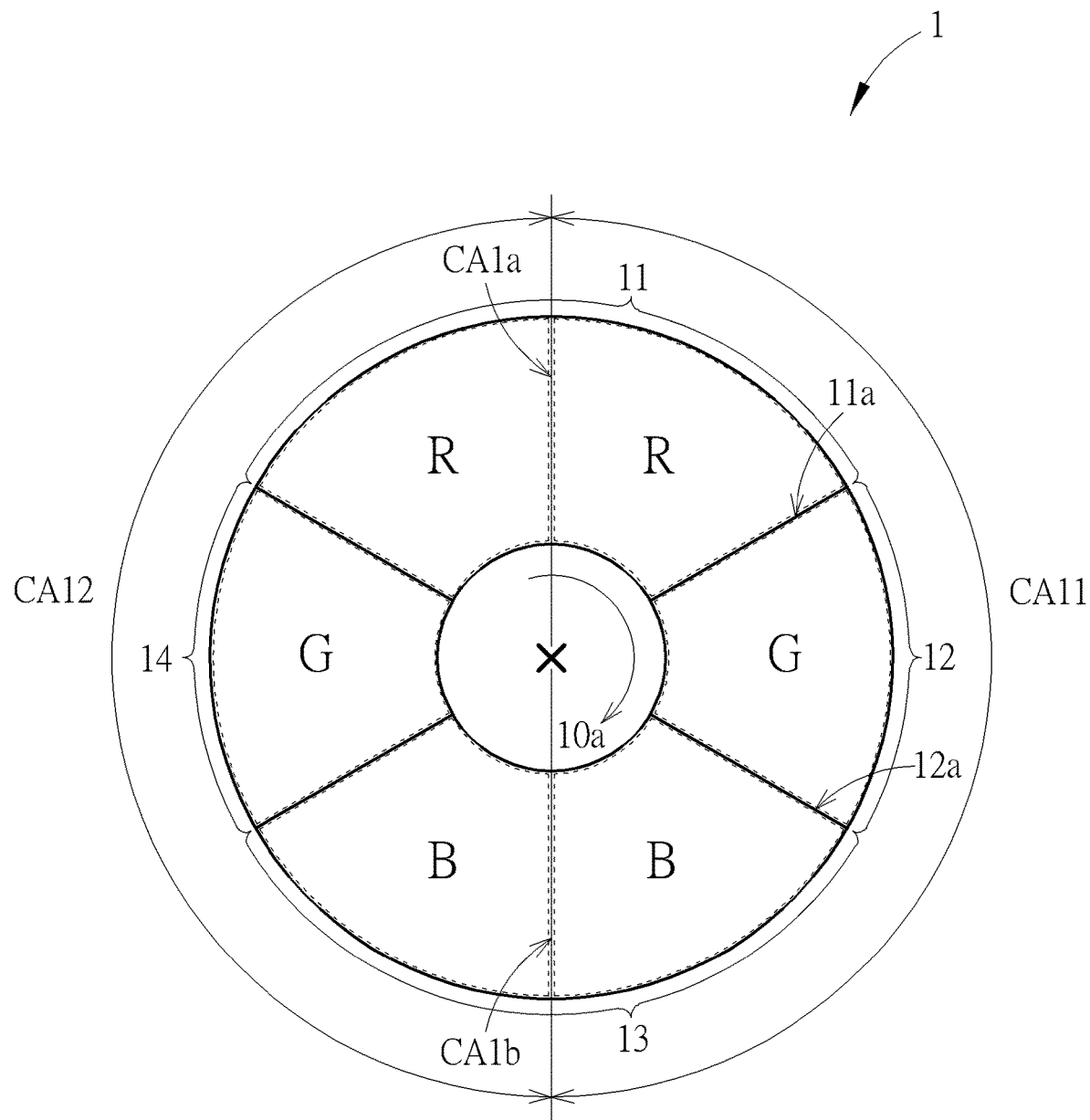
FIG. 1 is a schematic diagram illustrating a color wheel according to an embodiment.

Please refer to FIG. 1. A color wheel 1 according to an embodiment includes Y filter blocks (therein, Y is equal to 4 in the embodiment), i.e. four filter blocks 11, 12, 13 and 14, which are a red filter block, a green light filter block, a blue light filter block, and a green light filter block respectively and are arranged in an annular direction 10a (which is defined relative to the rotation axis of the color wheel 1 and is indicated by an arrow in the figure; therein, the rotation axis is indicated by a cross mark in the figure). The four physical filter blocks 11-14 correspond to X light colors (therein, X is equal to 3 in the embodiment), i.e. three light colors (i.e. red light, green light, and blue light). Therein, the filter blocks 11-14 correspond to red light, green light, blue light, and green light respectively. The four filter blocks 11-14 are defined to be formed of X color blocks, i.e. three color blocks (i.e. a red color block R, a green color block G, and a blue color block B, which are shown by frames in dashed lines in FIG. 1 and are labeled R, G, B respectively; therein, the frames are shrunk for convenience of identifying the color blocks). The light permeability characteristics of the three color blocks R, G and B are distinct from one another. The three color blocks R, G and B correspond to the three light colors respectively (i.e. corresponding to red light, green light, and blue light respectively). In practice, based on their light permeability characteristics, the three color blocks R, G and B can transmit red light, green light, and blue light respectively (e.g. by filtering white light emitted by a light source). The three color blocks R, G and B are equal in area. In the embodiment, the filter block 11 is formed by two red color blocks R. The filter block 12 is formed by one green color block G. The filter block 13 is formed by two blue color blocks B. The filter block 14 is formed by one green color block G. In another aspect, the color wheel 1 can be regarded as being provided with three color blocks R, G and B which are defined to be arranged in an annular direction 10a by repeating (N-1) times (therein, N is equal to 2 in the embodiment), i.e. 1 time. Therein, for the first arrangement, the three color block R, G and B are arranged by a color order of R, G and B (assigned as a first color order) in the annular direction 10a. For the second arrangement, the three color block R, G and B are arranged by a color order of B, G and R (assigned as a second color order) in the annular direction 10a. In other words, the three color blocks R, G and B are arranged in the annular direction 10a by the first color order and the second color order respectively and successively. The first color order is different from the second color order. Adjacent two of the color blocks (e.g. the upper two red color blocks R, i.e. the filter block 11, or the lower two blue color blocks, i.e. the filter block 13 in FIG. 1) which are arranged by the first color order and the second color order respectively have the same light permeability characteristic.

Furthermore, in the embodiment, the color wheel 1 includes N central angles (therein, N is equal to 2 in the embodiment), i.e. two central angles CA11 and CA12 (relative to the rotation axis). The central angles CA11 and CA12 are equal. Each of the central angle CA11 and CA12 the X color blocks, i.e. corresponds to the three color blocks R, G and B (i.e. covering the three color blocks R, G and B). In the view point of FIG. 1, the central angles CA11 and CA12 adjoin at the upper and lower locations in the figure. Therein, an adjacent edge CA1a of the central angles CA11 and CA12 at the upper portion of the figure and an adjacent edge of any two adjacent filter blocks 11-14 (e.g. an adjacent edge 11a of the filter blocks 11 and 12) are staggered. An adjacent edge CA1b of the central angles CA11 and CA12 at the lower portion of the figure and an adjacent edge of any two adjacent filter blocks 11-14 (e.g. an adjacent edge 12a of the filter blocks 12 and 13) are staggered. In another aspect, in the color wheel 1, the filter block 11 is formed by two color blocks (i.e. the red color blocks R) which have the same light permeability characteristic, and corresponds to the adjacent edge CA1a. The filter block 13 is formed by two color blocks (i.e. the blue color blocks B) which have the same light permeability characteristic, and corresponds to the adjacent edge CA1b.

Figure 2:
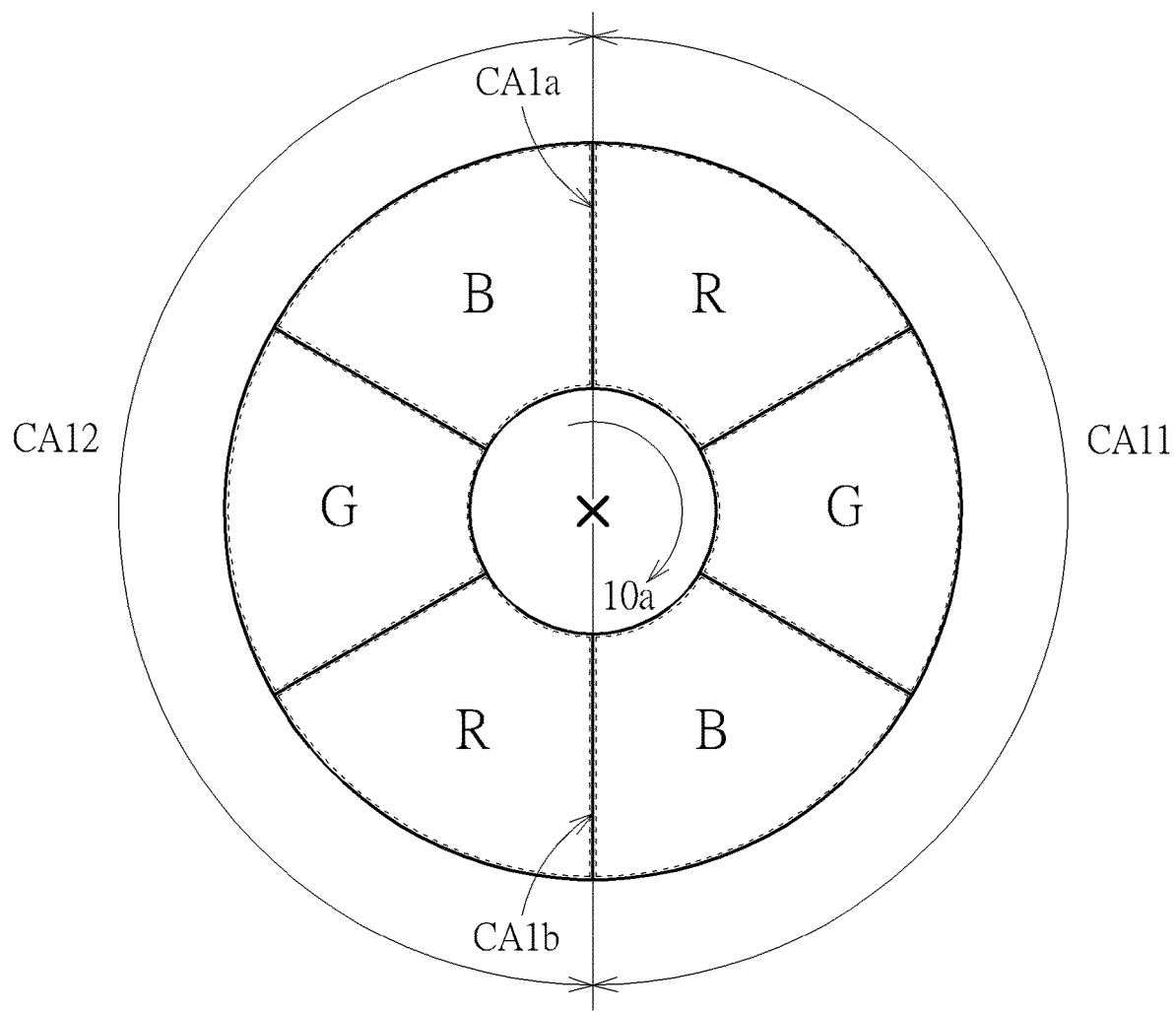
FIG. 2 is a schematic diagram illustrating a common color wheel.
Figure 3:
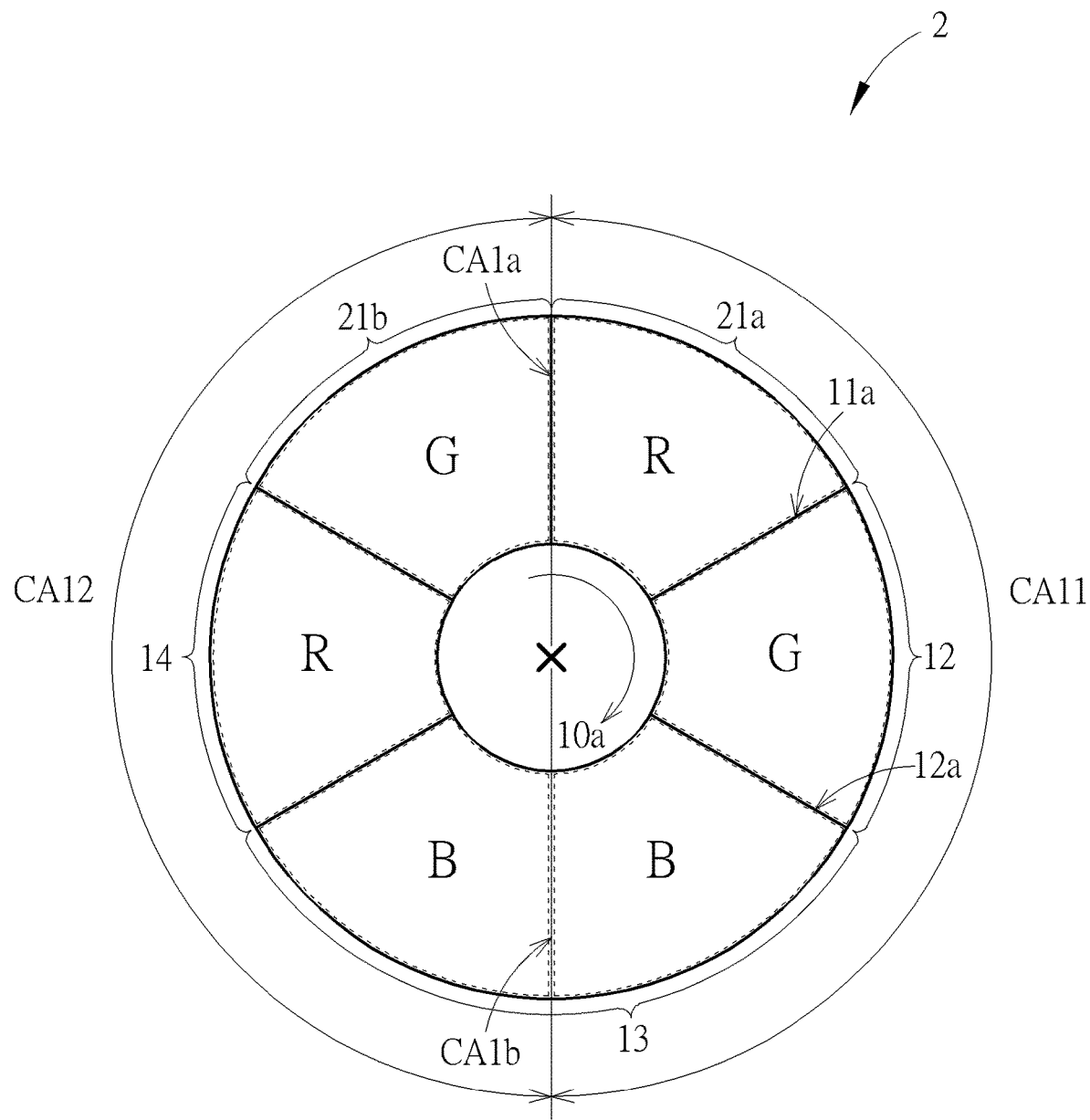
FIG. 3 is a schematic diagram illustrating a color wheel according to another embodiment.

In practice, the color wheel 1 can be used in a 3-color projection system. The color wheel 1 can transmit light in three different colors by use of the filter blocks in each of the central angle CA11 and CA12, so each of the central angles CA11 and CA12 corresponds to one projection period (used for projecting a frame of color image). Although the arrangement orders of the three color blocks R, G and B within the central angles CA11 and CA12 are different, it is practicable to control a digital micromirror device (DMD) of the projection system to operate in coordination with the time sequence of light colors provided by the color wheel 1, so as to overcome the difference between the arrangement orders. In addition, for a common color wheel (as shown by FIG. 2), its filter blocks (labeled R, G, B in the figure) are repeatedly arranged by the same arrangement order. Compared with the color wheel 1, the common color wheel (labeled corresponding central angles CA11 and CA12 in FIG. 2 for convenience of comparison) has a spoke transition area between any adjacent two filter block within each of central angles CA11 and CA12. Furthermore, because the two adjacent filter blocks in the central angles CA11 and CA12 respectively are different, a spoke transition area is formed between the two adjacent filter blocks at the junction of the central angles CA11 and CA12. In the above color wheel 1, the adjacent edges CA1a and CA1b of the central angles CA11 and CA12 do not align with any junctions of physical filter blocks, so no spoke transition area will be formed at the junctions of the central angles CA11 and CA12; thereby, the color brightness of the projected images can be improved. In addition, in practice, the color wheel 1 can be modified to be a color wheel 2 as shown by FIG. 3. In the color wheel 2, the portion thereof corresponding to the filter block 11 of the color wheel 1 is divided into filter blocks 21a and 21b (formed by a red color block R and a green color block G respectively). The filter block 14 of the color wheel 2 is formed by a red color block R relative to the color wheel 1. In the color wheel 2, the lower adjacent edge CA1b of the central angles CA11 and CA12 is still not aligned with a junction of physical filter block, which still has the effect of improving the color brightness of the projected images. In another aspect, in the color wheel 2, the three color blocks R, G and B are also arranged twice (e.g. N=2). The color block at an end of the first time (i.e. the (N−1)th time) and the color block at a start of the second time (i.e. the (N)th time) have the same light permeability characteristic (i.e. that of blue color block B), which is also applicable to the color wheel 1. Furthermore, as shown by FIG. 1, in the embodiment, the adjacent edge CA1a is located within the corresponding filter block 11 and further at a middle line of the filter block 11. Furthermore, the adjacent edge CA1b is located within the corresponding filter block 13 and further at a middle line of the filter block 13. However, in practice, it is practicable to make different setting according to actual projection conditions (e.g. the adjacent edges CA1a and CA1b not being located at the middle lines of the filter blocks 11 and 13).

Furthermore, in the color wheel 1, within each of the central angles CA11 and CA12, each of the filter blocks 11-14 has the same arc length along the annular direction 10a. For example, within the central angle CA11, the red color block R of the filter block 11, the filter block 12 (i.e. one green color block G), and the blue color block B of the filter block 13 correspond to the same central angle in degrees and the same arc length. However, it is not limited thereto in practice. For example, within the central angle CA11, the central angle and arc length corresponding to the filter block 12 (i.e. one green color block G) are larger than the central angle and arc length corresponding to the red color block R of the filter block 11 or the blue color block B of the filter block 13. Furthermore, in the embodiment, for each light color, the filter blocks corresponding to the light color have the same arc length along the annular direction 10*a* in each central angle CA11 and CA12. For example, for green light, the central angle and arc length corresponding to the filter block 12 in the central angle CA11 are the same as the central angle and arc length corresponding to the filter block 14 of the central angle CA12 respectively. However, in practice, it is practicable to make different setting according to actual projection conditions (e.g. the corresponding arc lengths are not equal).

Furthermore, in the embodiment, three successive filter blocks (e.g. the filter blocks 11-13) can be defined as a primary area and a secondary area. The primary area is a first filter block (i.e. the filter block 11). The secondary area includes a second filter block (i.e. the filter block 12) and a third filter block (i.e. the filter block 13). The second filter block is smaller than the first filter block in area. The first filter block is twice the second filter block in area. For another example, three successive filter blocks 12-14 can be defined as a primary area and a secondary area. The primary area is a first filter block (i.e. the filter block 13). The secondary area includes a second filter block (i.e. the filter block 12) and a third filter block (i.e. the filter block 14). The second filter block is smaller than the first filter block. The first filter block is twice the second filter block.

In addition, in the embodiment, in logic, the color wheel 1 has Y physical filter blocks. The color wheel 1 thereon defines X color blocks (corresponding X light colors respectively) which are arranged in the annular direction 10*a* by repeating (N−1) times. Each filter block is formed by one or more of one of the X defined color blocks. Therefore, the color wheel 1 can provide light of X light colors in each arrangement. Therein, X, N and Y satisfy the following equation: (X×N)−N=Y. In the embodiment, X is equal to 3, N is equal to 2, and Y is equal to 4.

Figure 4:
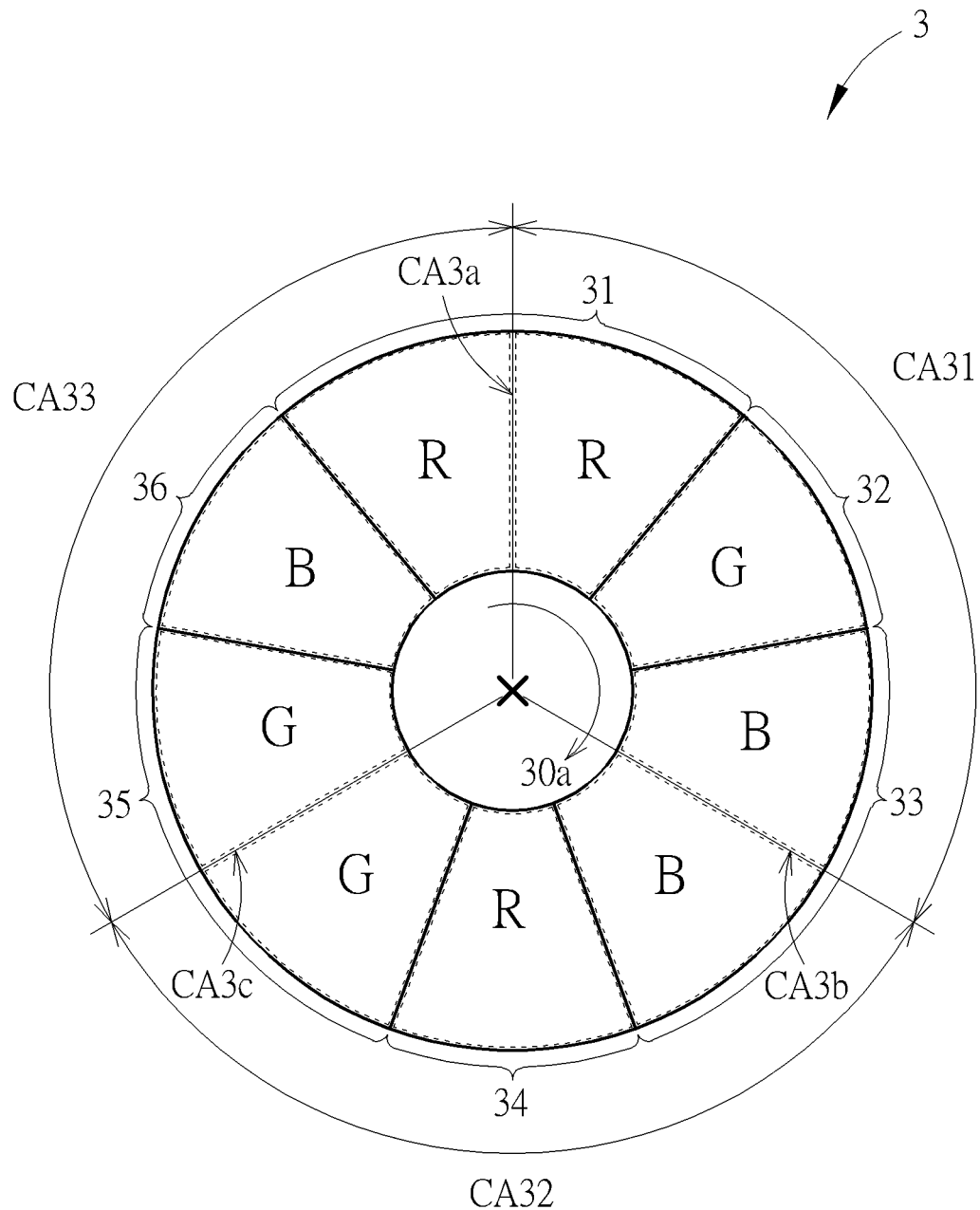
FIG. 4 is a schematic diagram illustrating a color wheel according to another embodiment.

Please refer to FIG. 4. A color wheel 3 according to another embodiment includes Y filter blocks (therein, Y is equal to 6 in the embodiment), i.e. six filter blocks 31, 32, 33, 34, 35 and 36, which are a red filter block, a green filter block, a blue filter block, a red filter block, a green filter block, and a blue filter block respectively arranged an annular direction 30*a* (defined relative to the rotation axis of the color wheel 3 and indicated by an arrow in the figure; therein, the rotation axis of the color wheel 3 is indicated by a cross mark in the figure). The six physical filter blocks 31-36 correspond to X light colors (therein, X is equal to 3 in the embodiment), i.e. three light colors (i.e. red light, green light, and blue light). Therein, the filter blocks 31-36 correspond to red light, green light, blue light, red light, green light, and blue light respectively. The six filter blocks 31-36 are formed of X color blocks, i.e. three color blocks (i.e. a red color block R, a green color block G, and a blue color block B, which are shown by frames in dashed lines in FIG. 4 and are labeled R, G, B respectively; therein, the frames are shrunk for convenience of identifying the color blocks). The light permeability characteristics of the three color blocks R, G and B are distinct from one another. The three color blocks R, G and B correspond to the three light colors respectively (i.e. corresponding to red light, green light, and blue light respectively). In practice, based on their light permeability characteristics, the three color blocks R, G and B can transmit red light, green light, and blue light respectively (e.g. by filtering white light emitted by a light source). The three color blocks R, G and B are equal in area.

In the embodiment, the filter block 31 is formed by two red color blocks R. The filter block 32 is formed by one green color block G. The filter block 33 is formed by two blue color blocks B. The filter block 34 is formed by one red color block R. The filter block 35 is formed by two green color blocks G. The filter block 36 is formed by one blue color block B. Furthermore, in the embodiment, the color wheel 3 includes N central angles (therein, N is equal to 3 in the embodiment), i.e. three central angles CA31, CA32 and CA33 (relative to the rotation axis). The central angles CA31, CA32 and CA33 are equal. Each of the central angles CA31, CA32 and CA33 covers the three color blocks R, G and B.

In the embodiment, the arrangement logic of the filter blocks of the color wheel 3 is similar to that of the color wheel 1. A difference therebetween is that the three color blocks R, G and B are arranged by three times on the color wheel 3. The other structural features of the color wheel 3 are the same as the color wheel 1. For example, the adjacent edges of the central angles CA31, CA32 and CA33 (i.e. the junctions thereof) and the adjacent edge of any two adjacent filter blocks 31-36 (i.e. the junctions thereof) are staggered. For example, the adjacent edge CA3*a* of the central angles CA31 and CA33 does not align with the junction of the filter blocks 31 and 32 and the junction of the filter blocks 31 and 36. The adjacent edge CA3*b* of the central angles CA31 and CA32 does not align with the junction of the filter blocks 32 and 33 and the junction of the filter blocks 33 and 34. The adjacent edge CA3*c* of the central angles CA32 and CA33 does not align with the junction of the filter blocks 34 and 35 and the junction of the filter blocks 35 and 36. For other descriptions about the color wheel 3, please refer to the relevant descriptions of the color wheel 1 and variations thereof, which will not be described in addition. Furthermore, in the embodiment, in logic, the color wheel 3 has Y physical filter blocks. The color wheel 3 thereon defines X color blocks (corresponding X light colors respectively) which are arranged in the annular direction 30*a* by repeating (N−1) times. Each filter block is formed by one or more of one of the X defined color blocks. Therefore, the color wheel 3 can provide light of X light colors in each arrangement. Therein, X is equal to 3, N is equal to 3, Y is equal to 6, and X, N and Y satisfy the following equation: (X×N)−N=Y.

Figure 5:
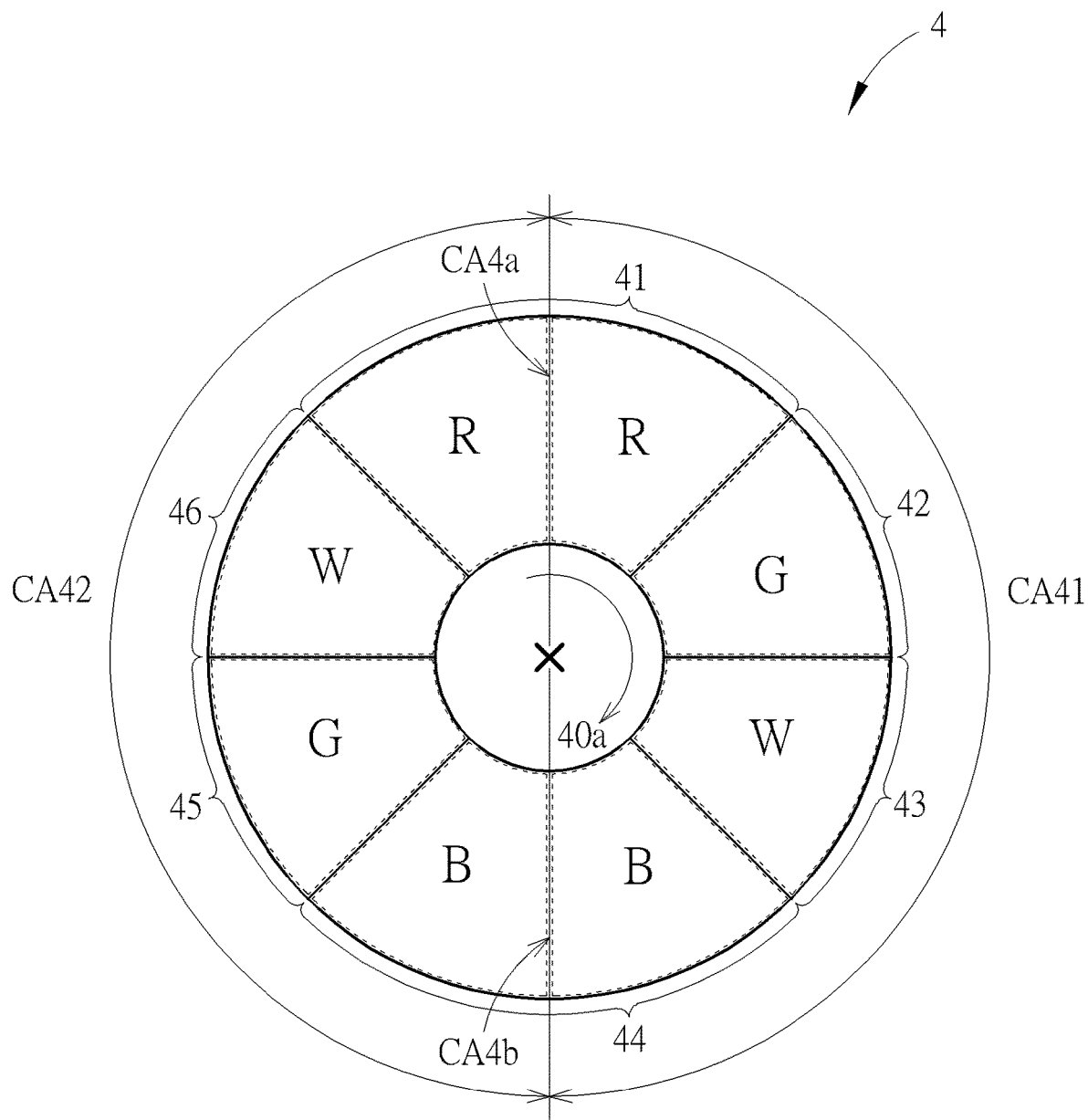
FIG. 5 is a schematic diagram illustrating a color wheel according to another embodiment.

Please refer to FIG. 5. A color wheel 4 according to another embodiment includes Y filter blocks (therein, Y is equal to 6 in the embodiment), i.e. six filter blocks 41, 42, 43, 44, 45 and 46, which are a red filter block, a green filter block, a white filter block, a blue filter block, a green filter block, and a white filter block respectively arranged an annular direction 40*a* (defined relative to the rotation axis of the color wheel 4 and indicated by an arrow in the figure; therein, the rotation axis of the color wheel 4 is indicated by a cross mark in the figure). In practice, the color wheel 4 can be realized by a transparent circle plate, on which different filter films are attached. Therein, the white filter block can be realized by the corresponding area without attaching any filter film thereon; that is, the corresponding area will not filter light in principle. The six physical filter blocks 41-46 correspond to X light colors (therein, X is equal to 4 in the embodiment), i.e. four light colors (i.e. red light, green light, blue light, and white light). Therein, the filter blocks 41-46 correspond to red light, green light, white light, blue light, green light, and white light respectively. The six filter blocks 41-46 are formed of X color blocks, i.e. four color blocks (i.e. a red color block R, a green color block G, a blue color block B, and a white color block W, which are shown by frames in dashed lines in FIG. 5 and are labeled R, G, B, W respectively; therein, the frames are shrunk for convenience of identifying the color blocks). The light permeability characteristics of the four color blocks R, G, B and W are distinct from one another. The four color blocks R, G, B and W correspond to the four light colors respectively (i.e. corresponding to red light, green light, blue light, and white light respectively). In practice, based on their light permeability characteristics, the four color blocks R, G, B and W can transmit red light, green light, blue light, and white light (i.e. without filtering for obtaining the white light directly) respectively (e.g. by filtering white light emitted by a light source). The four color blocks R, G, B and W are equal in area. In the embodiment, the filter block 41 is formed by two red color blocks R. The filter block 42 is formed by one green color block G. The filter block 43 is formed by one white color block W. The filter block 44 is formed by two blue color blocks B. The filter block 45 is formed by one green color block G. The filter block 46 is formed by two white color blocks W. Furthermore, in the embodiment, the color wheel 4 includes N central angles (therein, N is equal to 2 in the embodiment), i.e. two central angles CA41 and CA42 (relative to the rotation axis). The central angles CA41 and CA42 are equal. Each of the central angles CA41 and CA42 covers the four color blocks R, G, B and W.

In the embodiment, the arrangement logic of the filter blocks of the color wheel 4 is similar to that of the color wheel 1. A difference therebetween is that the four color blocks R, G, B and W are arranged on the color wheel 4. The other structural features of the color wheel 4 are the same as the color wheel 1. For example, the adjacent edges of the central angles CA41 and CA42 (i.e. the junctions thereof) and the adjacent edge of any two adjacent filter blocks 41-46 (i.e. the junctions thereof) are staggered. For example, the adjacent edge CA4*a* of the central angles CA41 and CA42 does not align with the junction of the filter blocks 41 and 42 and the junction of the filter blocks 41 and 46. The adjacent edge CA4*b* of the central angles CA41 and CA42 does not align with the junction of the filter blocks 43 and 44 and the junction of the filter blocks 44 and 45. For other descriptions about the color wheel 4, please refer to the relevant descriptions of the color wheel 1 and variations thereof, which will not be described in addition. Furthermore, in the embodiment, in logic, the color wheel 4 has Y physical filter blocks. The color wheel 4 thereon defines X color blocks (corresponding X light colors respectively) which are arranged in the annular direction 40*a* by repeating (N−1) times. Each filter block is formed by one or more of one of the X defined color blocks. Therefore, the color wheel 4 can provide light of X light colors in each arrangement. Therein, X is equal to 4, N is equal to 2, Y is equal to 6, and X, N and Y satisfy the following equation: (X×N)−N=Y.

Figure 6:
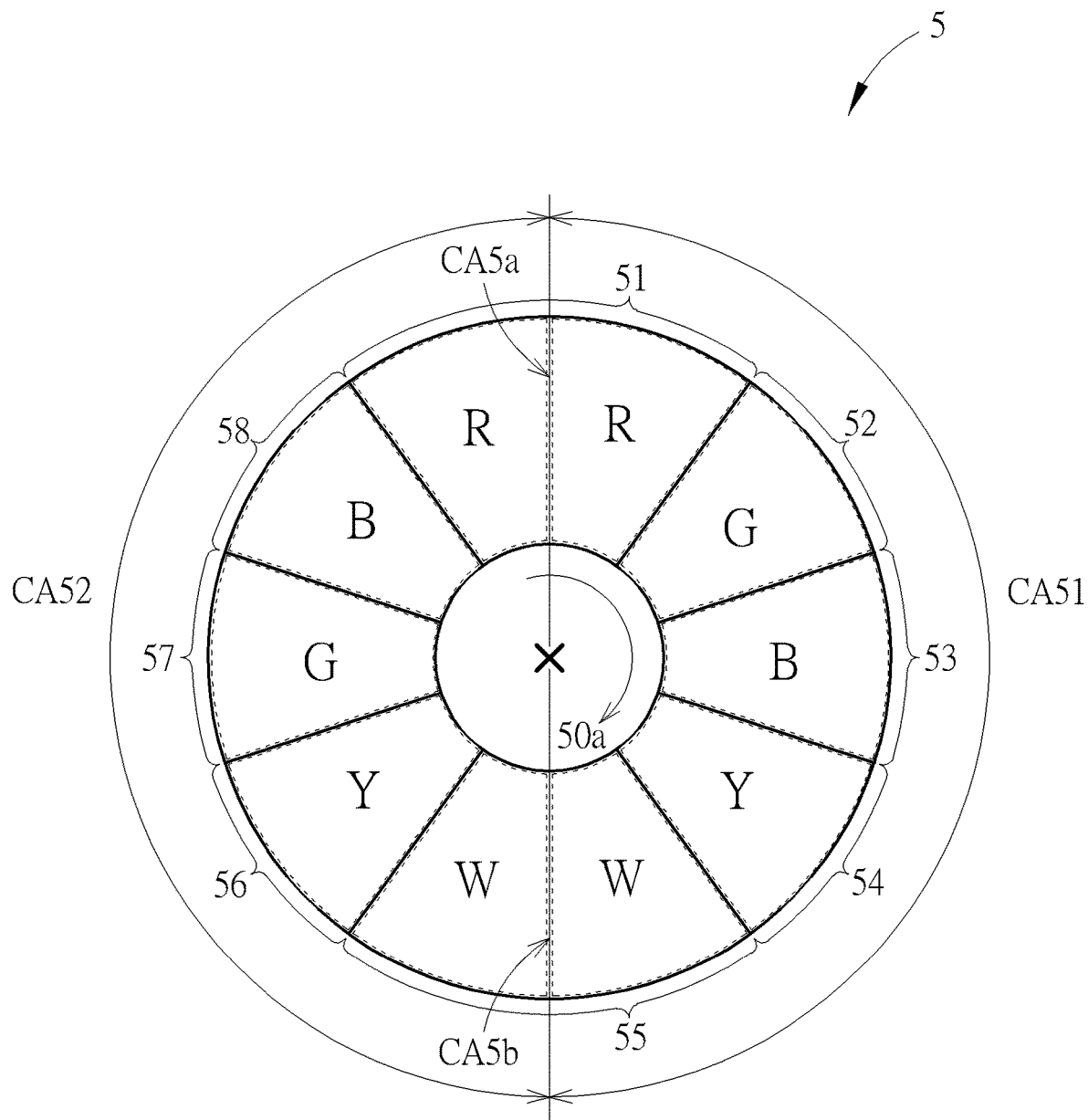
FIG. 6 is a schematic diagram illustrating a color wheel according to another embodiment.

Please refer to FIG. 6. A color wheel 5 according to another embodiment includes Y filter blocks (therein, Y is equal to 8 in the embodiment), i.e. eight filter blocks 51, 52, 53, 54, 55, 56, 57 and 58, which are a red filter block, a green filter block, a blue filter block, a yellow filter block, a white filter block, a yellow filter block, a green filter block, and a blue filter block respectively arranged an annular direction 50*a* (defined relative to the rotation axis of the color wheel 5 and indicated by an arrow in the figure; therein, the rotation axis of the color wheel 5 is indicated by a cross mark in the figure). In practice, the color wheel 5 can be realized by a transparent circle plate, on which different filter films are attached. Therein, the white filter block can be realized by the corresponding area without attaching any filter film thereon; that is, the corresponding area will not filter light in principle. The eight physical filter blocks 51-58 correspond to X light colors (therein, X is equal to 5 in the embodiment), i.e. five light colors (i.e. red light, green light, blue light, yellow light, and white light). Therein, the filter blocks 51-58 correspond to red light, green light, blue light, yellow light, white light, yellow light, green light, and blue light respectively. The eight filter blocks 51-58 are formed of X color blocks, i.e. five color blocks (i.e. a red color block R, a green color block G, a blue color block B, yellow color block Y and a white color block W, which are shown by frames in dashed lines in FIG. 6 and are labeled R, G, B, Y, W respectively; therein, the frames are shrunk for convenience of identifying the color blocks). The light permeability characteristics of the five color blocks R, G, B, Y and W are distinct from one another. The five color blocks R, G, B, Y and W correspond to the five light colors respectively (i.e. corresponding to red light, green light, blue light, yellow light, and white light respectively). In practice, based on their light permeability characteristics, the five color blocks R, G, B, Y and W can transmit red light, green light, blue light, yellow light, and white light (i.e. without filtering for obtaining the white light directly) respectively (e.g. by filtering white light emitted by a light source). The five color blocks R, G, B, Y and W are equal in area. In the embodiment, the filter block 51 is formed by two red color blocks R. The filter block 52 is formed by one green color block G. The filter block 53 is formed by one blue color block B. The filter block 54 is formed by one yellow color block Y. The filter block 55 is formed by two white color blocks W. The filter block 56 is formed by one yellow color block Y. The filter block 57 is formed by one green color block G. The filter block 58 is formed by one blue color block B. Furthermore, in the embodiment, the color wheel 5 includes N central angles (therein, N is equal to 2 in the embodiment), i.e. two central angles CA51 and CA52 (relative to the rotation axis). The central angles CA51 and CA52 are equal. Each of the central angles CA51 and CA52 covers the five color blocks R, G, B, Y and W.

In the embodiment, the arrangement logic of the filter blocks of the color wheel 5 is similar to that of the color wheel 1. A difference therebetween is that the five color blocks R, G, B, Y and W are arranged on the color wheel 5. The other structural features of the color wheel 5 are the same as the color wheel 1. For example, the adjacent edges of the central angles CA51 and CA52 (i.e. the junctions thereof) and the adjacent edge of any two adjacent filter blocks 51-58 (i.e. the junctions thereof) are staggered. For example, the adjacent edge CA5*a* of the central angles CA51 and CA52 does not align with the junction of the filter blocks 51 and 52 and the junction of the filter blocks 51 and 58. The adjacent edge CA5*b* of the central angles CA51 and CA52 does not align with the junction of the filter blocks 54 and 55 and the junction of the filter blocks 55 and 56. For other descriptions about the color wheel 5, please refer to the relevant descriptions of the color wheel 1 and variations thereof, which will not be described in addition. Furthermore, in the embodiment, in logic, the color wheel 5 has Y physical filter blocks. The color wheel 5 thereon defines X color blocks (corresponding X light colors respectively) which are arranged in the annular direction 50*a* by repeating (N−1) times. Each filter block is formed by one or more of one of the X defined color blocks. Therefore, the color wheel 5 can provide light of X light colors in each arrangement. Therein, X is equal to 5, N is equal to 2, Y is equal to 8, and X, N and Y satisfy the following equation: (X×N)−N=Y.

Figure 7:
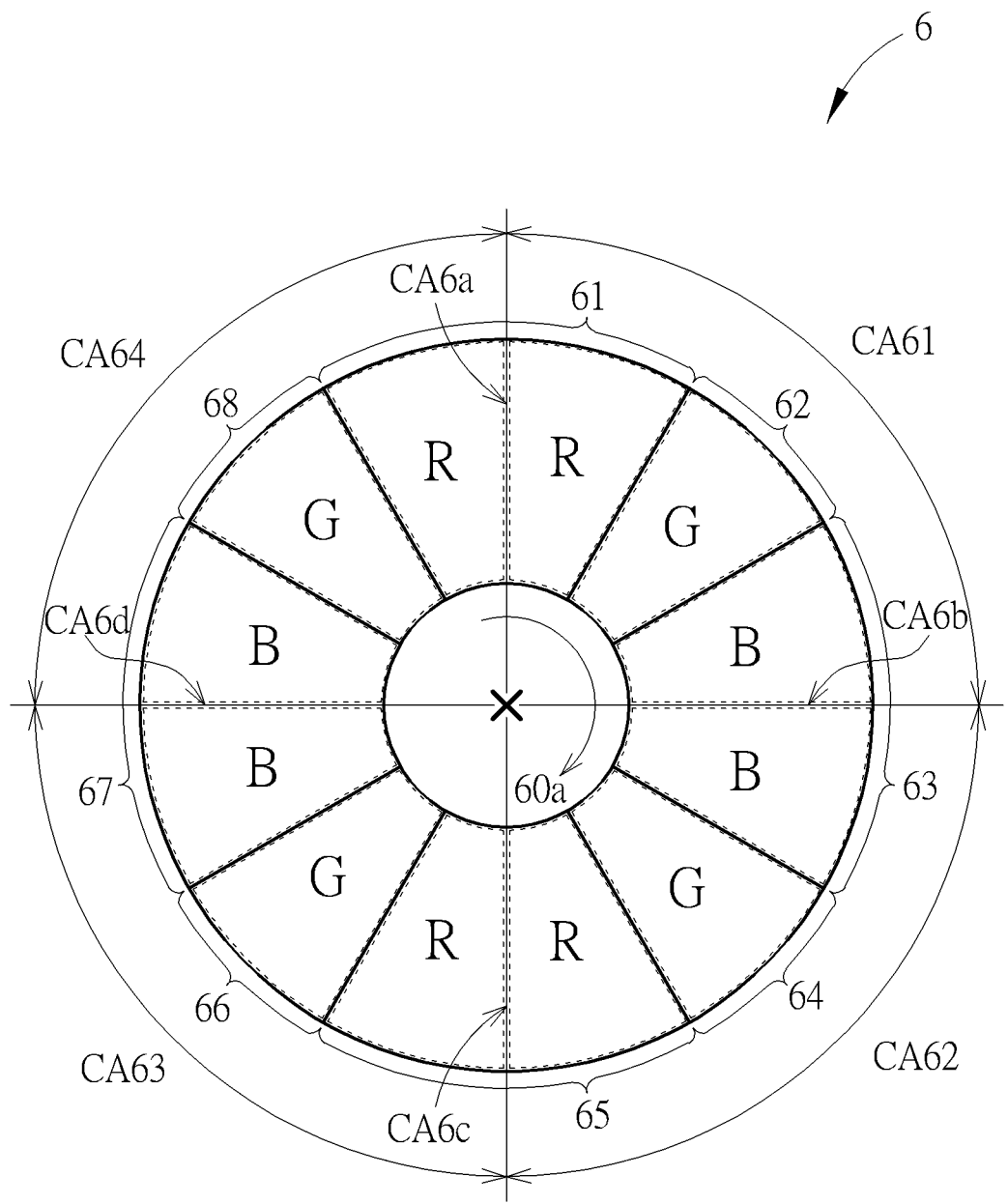
FIG. 7 is a schematic diagram illustrating a color wheel according to another embodiment.

Please refer to FIG. 7. A color wheel 6 according to another embodiment includes Y filter blocks (therein, Y is equal to 8 in the embodiment), i.e. eight filter blocks 61, 62, 63, 64, 65, 66, 67 and 68, which are a red filter block, a green filter block, a blue filter block, a green filter block, a red filter block, a green filter block, a blue filter block, and a green filter block respectively arranged an annular direction 60a (defined relative to the rotation axis of the color wheel 6 and indicated by an arrow in the figure; therein, the rotation axis of the color wheel 6 is indicated by a cross mark in the figure). The eight physical filter blocks 61-68 correspond to X light colors (therein, X is equal to 3 in the embodiment), i.e. three light colors (i.e. red light, green light, and blue light). Therein, the filter blocks 61-68 correspond to red light, green light, blue light, green light, red light, green light, blue light, and green light respectively. The eight filter blocks 61-68 are formed of X color blocks, i.e. three color blocks (i.e. a red color block R, a green color block G, and a blue color block B, which are shown by frames in dashed lines in FIG. 7 and are labeled R, G and B respectively; therein, the frames are shrunk for convenience of identifying the color blocks). The light permeability characteristics of the five color blocks R, G and B are distinct from one another. The three color blocks R, G and B correspond to the three light colors respectively (i.e. corresponding to red light, green light, and blue light respectively). In practice, based on their light permeability characteristics, the three color blocks R, G and B can transmit red light, green light, and blue light respectively (e.g. by filtering white light emitted by a light source). The three color blocks R, G and B are equal in area. In the embodiment, the filter block 61 is formed by two red color blocks R. The filter block 62 is formed by one green color block G. The filter block 63 is formed by one blue color block B. The filter block 64 is formed by one green color block G. The filter block 65 is formed by two red color blocks R. The filter block 66 is formed by one green color block G. The filter block 67 is formed by one blue color block B. The filter block 68 is formed by one green color block G. Furthermore, in the embodiment, the color wheel 6 includes N central angles (therein, N is equal to 4 in the embodiment), i.e. four central angles CA61, CA62, CA63, and CA64 (relative to the rotation axis). The central angles CA61, CA62, CA63, and CA64 are equal. Each of the central angles CA61, CA62, CA63, and CA64 covers the three color blocks R, G and B.

In the embodiment, the arrangement logic of the filter blocks of the color wheel 6 is similar to that of the color wheel 1. A difference therebetween is that the three color blocks R, G and B are arranged by four times on the color wheel 6. The other structural features of the color wheel 6 are the same as the color wheel 1. For example, the adjacent edges of the central angles CA61, CA62, CA63 and CA64 (i.e. the junctions thereof) and the adjacent edge of any two adjacent filter blocks 61-68 (i.e. the junctions thereof) are staggered. For example, the adjacent edge CA6a of the central angles CA61 and CA63 does not align with the junction of the filter blocks 61 and 62 and the junction of the filter blocks 61 and 68. The adjacent edge CA6b of the central angles CA61 and CA62 does not align with the junction of the filter blocks 62 and 63 and the junction of the filter blocks 63 and 64. The adjacent edge CA6c of the central angles CA62 and CA63 does not align with the junction of the filter blocks 64 and 65 and the junction of the filter blocks 65 and 66. The adjacent edge CA6d of the central angles CA63 and CA64 does not align with the junction of the filter blocks 66 and 67 and the junction of the filter blocks 67 and 68. For other descriptions about the color wheel 6, please refer to the relevant descriptions of the color wheel 1 and variations thereof, which will not be described in addition. Furthermore, in the embodiment, in logic, the color wheel 6 has Y physical filter blocks. The color wheel 6 thereon defines X color blocks (corresponding X light colors respectively) which are arranged in the annular direction 60a by repeating (N-1) times. Each filter block is formed by one or more of one of the X defined color blocks. Therefore, the color wheel 6 can provide light of X light colors in each arrangement. Therein, X is equal to 3, N is equal to 4, Y is equal to 8, and X, N and Y satisfy the following equation: $(X \times N) - N = Y$.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A color wheel for a projector, comprising:
   X color blocks, the X color blocks being defined to be arranged in an annular direction by repeating (N-1) times, light permeability characteristics of the X color blocks being distinct from one another, the X color blocks corresponding to X light colors respectively, the X color blocks being substantially equal in area, X being an integer greater than or equal to 3, N being an integer greater than or equal to 2; and
   Y filter blocks, the Y filter blocks being formed of the X color blocks, the Y filter blocks corresponding to the X light colors;
   wherein one of the Y filter blocks is formed by adjacent two of the color blocks having the same light permeability characteristic.
2. The color wheel of claim 1, wherein the color block at an end of the (N-1)th time and the color block at a start of the (N)th time have the same light permeability characteristic.
3. The color wheel of claim 1, further comprising:
   N central angles, the N central angles being equal, each central angle covering the X color blocks, wherein a first adjacent edge of any adjacent two of the central angles and a second adjacent edge of any adjacent two of the Y filter blocks are staggered.
4. The color wheel of claim 3, wherein the first adjacent edge aligns with a middle line of the filter block corresponding to the first adjacent edge.
5. The color wheel of claim 1, wherein within each central angle, each filter block has the same arc length along the annular direction.
6. The color wheel of claim 1, wherein for each light color, the filter blocks corresponding to the light color have the same arc length along the annular direction in each central angle.
7. The color wheel of claim 1, wherein X, N and Y satisfy the following equation: $(X \times N) - N = Y$.
8. A color wheel for a projector, comprising:
   Y filter blocks, arranged in an annular direction, the Y filter blocks corresponding to X light colors, the Y filter blocks being defined to be formed of X color blocks, light permeability characteristics of the X color blocks being distinct from one another, the X color blocks corresponding to the X light colors respectively, the X color blocks being substantially equal in area, X being an integer greater than or equal to 3; and
   N central angles, the N central angles being equal, each central angle corresponding to the X color blocks, N being an integer greater than or equal to 2;

wherein a first adjacent edge of any adjacent two of the central angles and a second adjacent edge of any adjacent two of the Y filter blocks are staggered.

9. The color wheel of claim 8, wherein within each central angle, each filter block has the same arc length along the annular direction.

10. The color wheel of claim 8, wherein for each light color, the filter blocks corresponding to the light color have the same arc length along the annular direction in each central angle.

11. The color wheel of claim 8, wherein the first adjacent edge aligns within the filter block corresponding to the first adjacent edge.

12. The color wheel of claim 11, wherein the first adjacent edge aligns with a middle line of the filter block corresponding to the first adjacent edge.

13. The color wheel of claim 8, wherein the X light colors comprises red light, green light, and blue light, or comprises red light, green light, blue light, and white light, or comprises red light, green light, blue light, yellow light, and white light.

14. The color wheel of claim 8, wherein X successive ones of the filter blocks are defined as a primary area and a secondary area, the primary area is a first filter block, the secondary area comprises a second filter block and a third filter block, and the second filter block is less than the first filter block in area.

15. The color wheel of claim 14, wherein the first filter block is twice the second filter block in area.

16. The color wheel of claim 8, wherein the X color blocks are arranged by a first color order and a second color order in the annular direction, and the first color order and the second color order are different.

17. The color wheel of claim 16, wherein adjacent two of the color blocks which are arranged by the first color order and the second color order respectively have the same light permeability characteristic.

18. The color wheel of claim 8, wherein X, N and Y satisfy the following equation: $(X \times N) - N = Y$.

19. The color wheel of claim 8, wherein one of the Y filter blocks is formed by adjacent two of the color blocks having the same light permeability characteristic.

* * * * *